United States Patent [19]

Martin

[11] 4,378,983
[45] Apr. 5, 1983

[54] HOUSING FOR MOUNTING HEPA FILTERS

[75] Inventor: David T. Martin, Essendon, Australia

[73] Assignee: The Commonwealth of Australia, Melbourne, Australia

[21] Appl. No.: 276,386

[22] PCT Filed: Oct. 24, 1980

[86] PCT No.: PCT/AU80/00078
§ 371 Date: Jun. 15, 1981
§ 102(e) Date: Jun. 15, 1981

[87] PCT Pub. No.: WO81/01109
PCT Pub. Date: Apr. 30, 1981

[30] Foreign Application Priority Data

Oct. 26, 1979 [AU] Australia .............................. PE1088

[51] Int. Cl.³ ............................................. B01D 46/00
[52] U.S. Cl. ....................................... 55/357; 55/481; 55/502; 55/504; 55/506; 55/DIG. 9
[58] Field of Search ................................. 55/478–481, 55/357, 490, 502, 504, 506, DIG. 9

[56] References Cited
U.S. PATENT DOCUMENTS 4,023,944 5/1977 Beane .................................... 55/481
4,247,315 1/1981 Neumann ............................. 55/478

FOREIGN PATENT DOCUMENTS 118713 8/1944 Australia .
227772 4/1960 Australia .
406492 10/1966 Australia .
1532102 11/1978 United Kingdom .
2015372A 9/1979 United Kingdom .

Primary Examiner—Bernard Nozick

Baffle means (18) divides the interior of the casing into respective chambers (20, 22) which, on mounting of the filter in the slide structure (24), are gastight isolated from each other except by way of the filter and which are accessible from a respective one of the open ends of the casing. Also provided are gas intake/exhaust ports (46, 48) for each of the chambers (20, 22), a pair of cover members (14, 16) for closing the respective open-ends of the casing (12), each of which cover members (14, 16) includes a flange (94) complementary to the associated end of the casing (12), and respective clamp and seal means (100, 84) for clamping the cover members (14, 16) to the casing to effect gastight engagement of the flanges (94) with the respective ends of the casing (12).

16 Claims, 11 Drawing Figures

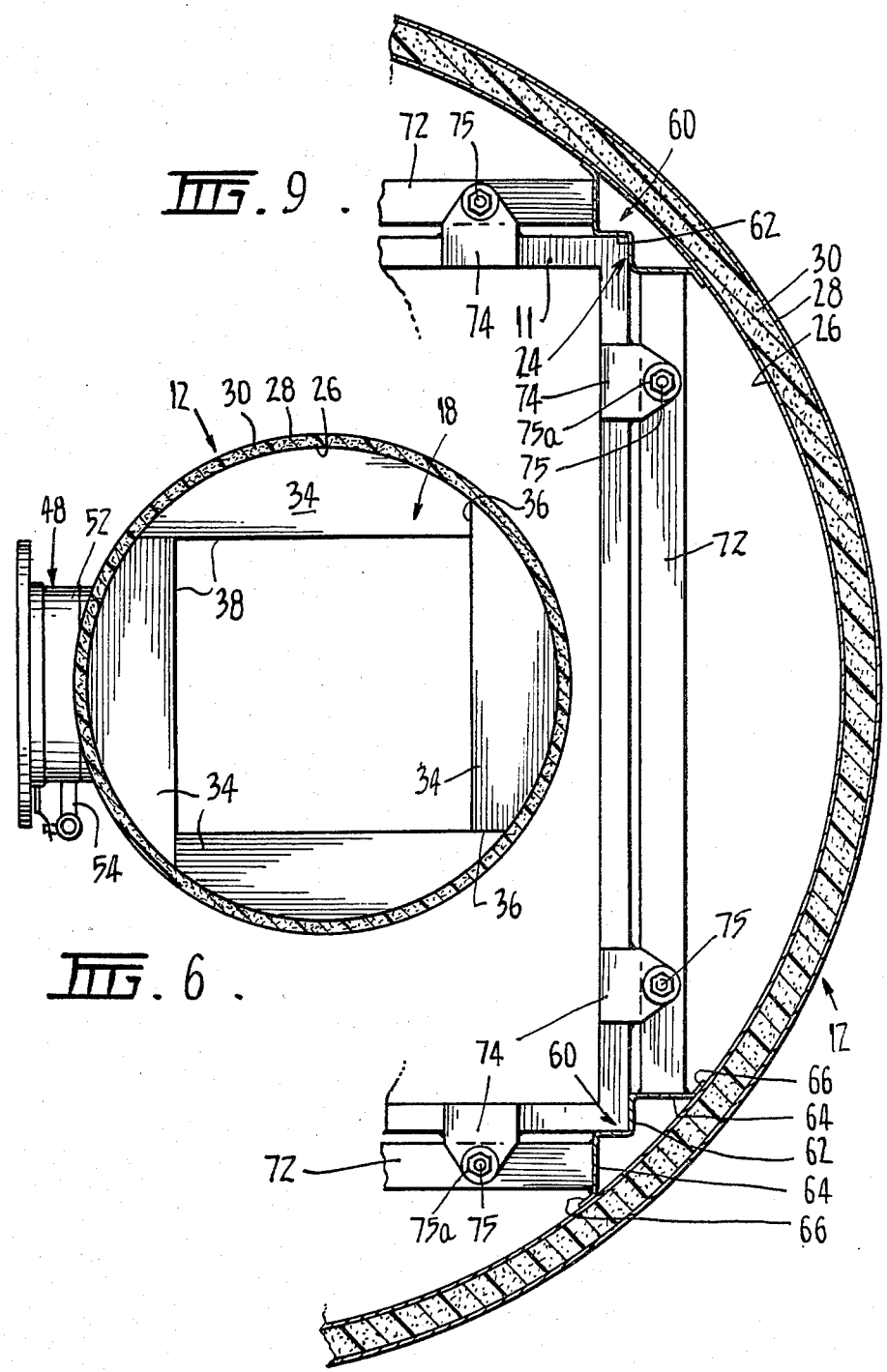

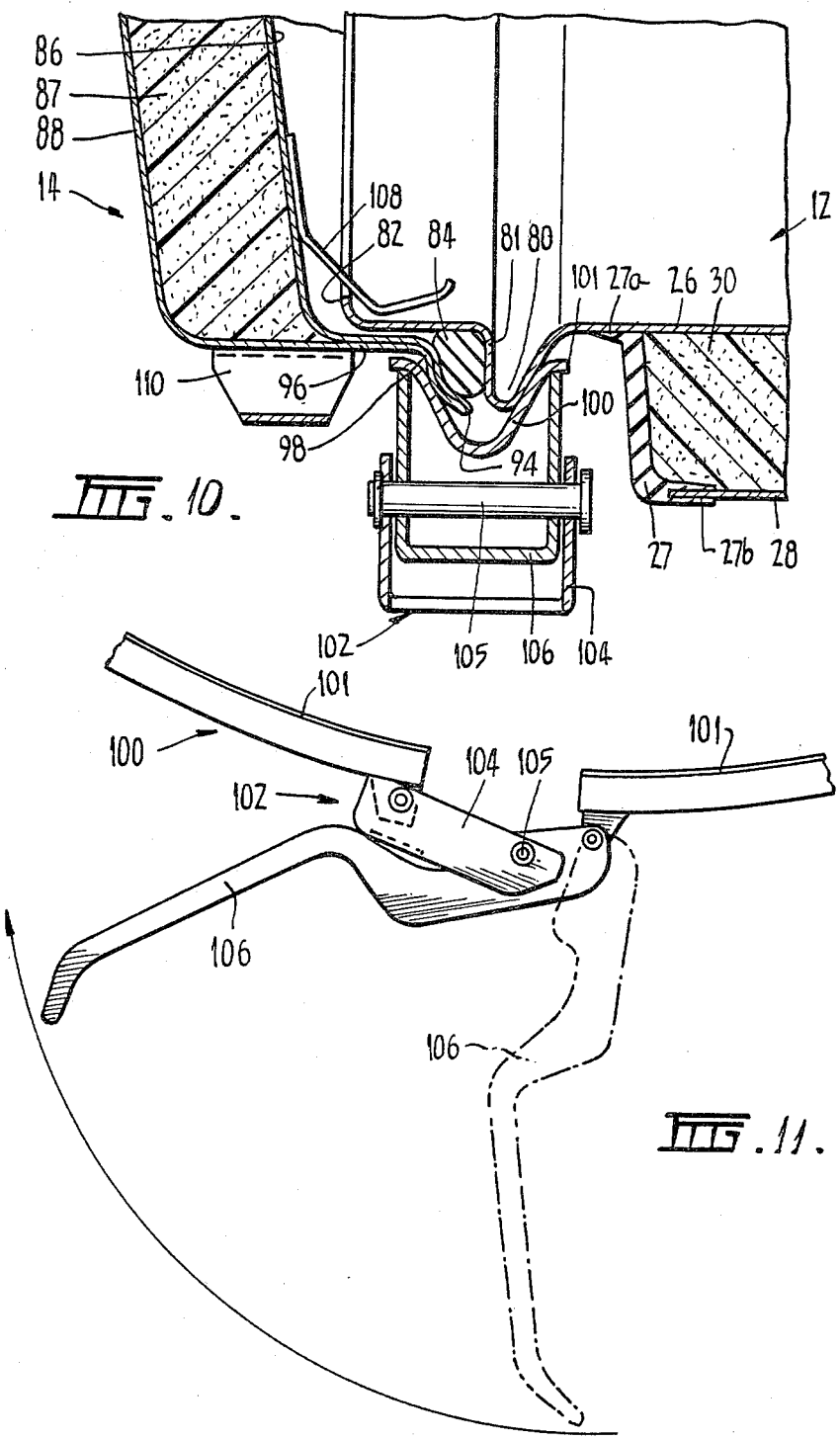

HOUSING FOR MOUNTING HEPA FILTERS

This invention relates to a housing for the mounting of high efficiency particulate arresting (HEPA) filters used, inter alia, in microbiological isolation facilities. The filters typically form part of air conditioning or ventilation systems used in heating, cooling or ventilation of environments which are microbiologically contaminated or sterile.

HEPA filters are usually of multiple pleated construction. The nature and relationship of the pleats may vary but the filters are commonly comparatively bulky and of generally box-like form. A long standing difficulty has been to provide an installation for satisfactorily mounting HEPA filters in such a way that the installation will not negate the rated performance of the filter (for example, an arrestance efficiency of 99.97% or 99.99% when challenged with a mono disperse cloud of 0.3 micro meter Dioctyl Phthalate droplets) while on the one hand allowing easy access for installation of the filter and for leak testing in situ, and on the other permitting acceptable gaseous decontamination. This is measured by achieving a complete kill of a known number of spores of the micro organism *Bacillus subtilis var niger*.

The present invention accordingly provides a housing for mounting HEPA filters, comprising:
an open-ended tubular casing;
slide structure within said casing for slidably mounting a HEPA filter from one of the ends of the casing to a position intermediate said ends;
baffle means disposed to divide the interior of said casing into respective chambers which, on mounting of the filter in said slide structure are gastight isolated from each other except by way of the filter and which are accessible from a respective one of the open ends of the casing;
gas intake/exhaust ports for each of said chambers;
a pair of cover members for closing the respective open-ends of the casing, each of which cover members includes a flange complementary to the associated end of the casing; and
respective clamp and seal means for clamping the cover members to said casing to effect gastight engagement of said flanges with the respective ends of the casing.

The cover members are preferably of shallow convex configuration and may be provided with a pair of spaced handles to facilitate their application to and removal from the housing. Each clamp and seal means may comprise a band arranged to be clamped about the respective flange and a sealing ring arranged to seat between the flange and the associated end of the casing.

Said slide structure may comprise a set of guide rails secured to the inside surface of said casing so as to extend parallel to the centre axis thereof. The rails may define four corner edge tracks for a rectangular HEPA filter and are advantageously of lipped W-configuration. Such structure may be secured wholly within one of said chambers and advantageously includes means for fastening the filter in firm engagement with said baffle means.

The tubular casing is advantageously of circular or elliptical cross-section and may include a pair of coaxial but axially displaced tubular parts joined but separated by an annular extension of said baffle means.

The invention will be further described, by way of example only, with reference to the accompanying drawings, in which:

FIG. 6 is a cross-section on the line 6—6 in FIG. 2;

FIGS. 8 and 9 are enlargements of portions of FIGS. 2 and 5 respectively, depicting portion of the filter slide structure, but showing the filter in position;

FIG. 10 is an enlargement of the region Y of FIG. 2; and

FIG. 11 is a front detail view of part of a band clamp lever, showing its movement to the band open position.

Figure 1:
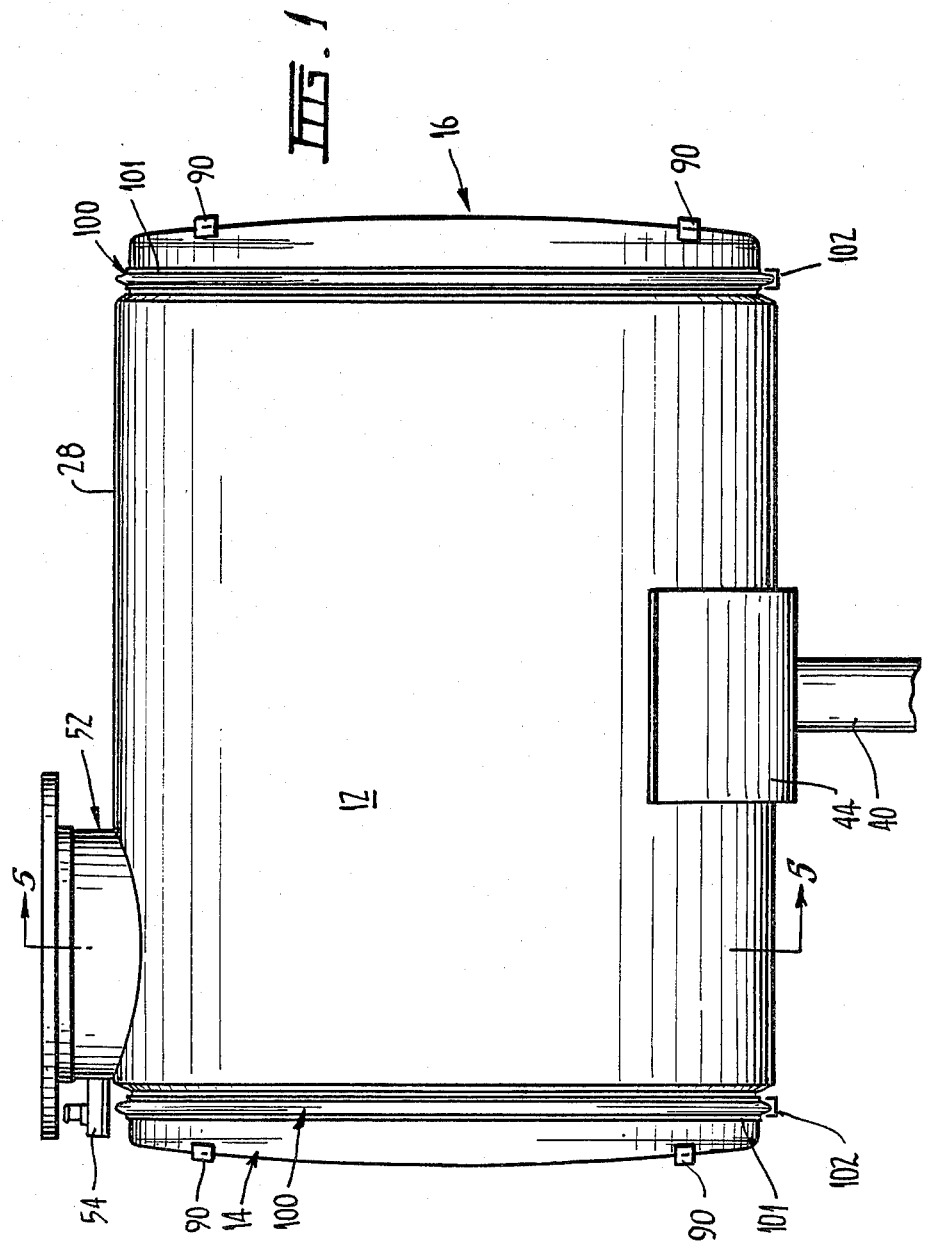
FIG. 1 is a side elevational view of a HEPA filter housing constructed in accordance with the invention.
Figure 2:
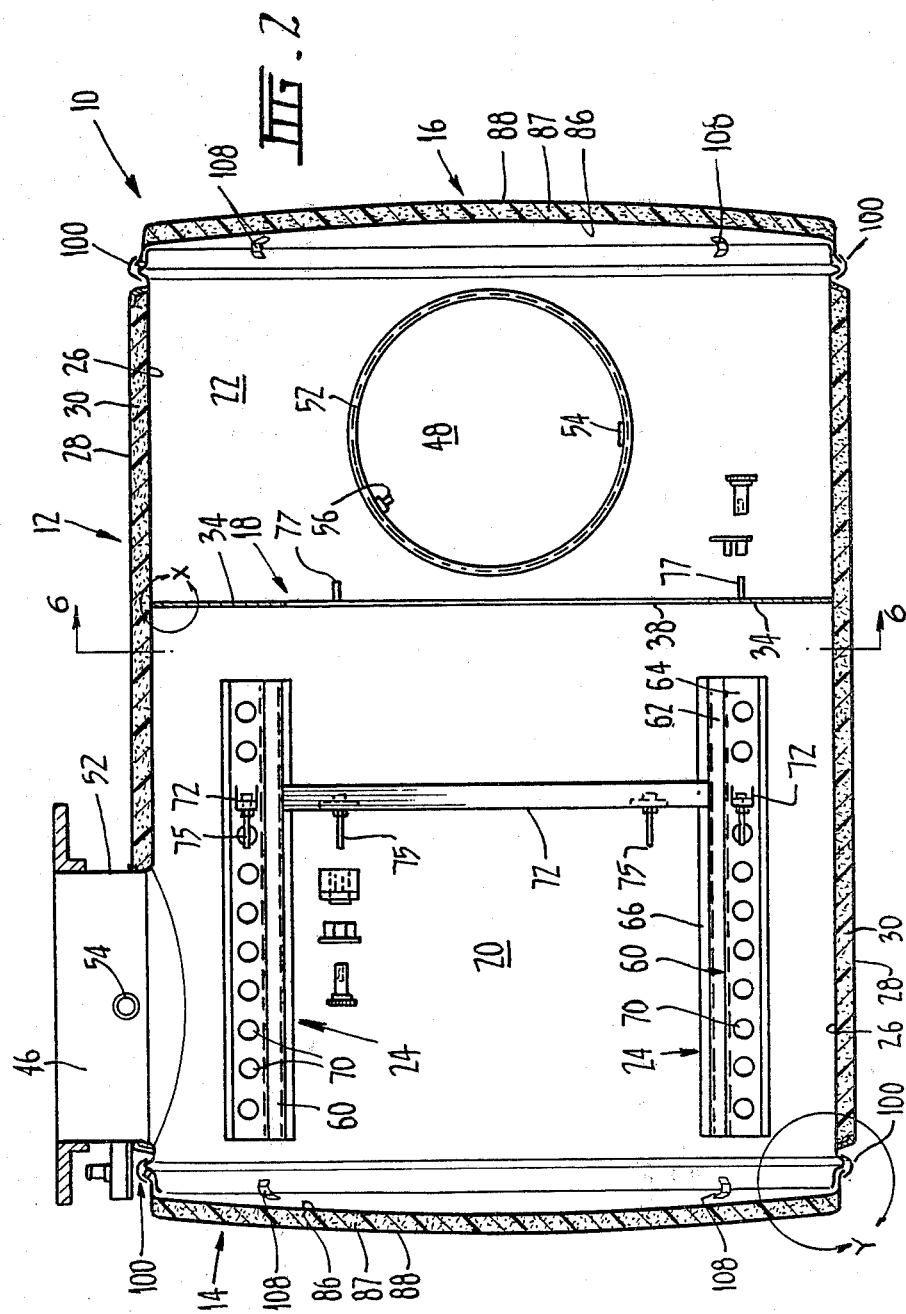
FIG. 2 is a partly exploded vertical axial cross-section through the housing shown in FIG. 1, without the HEPA filter in place.
Figure 3:
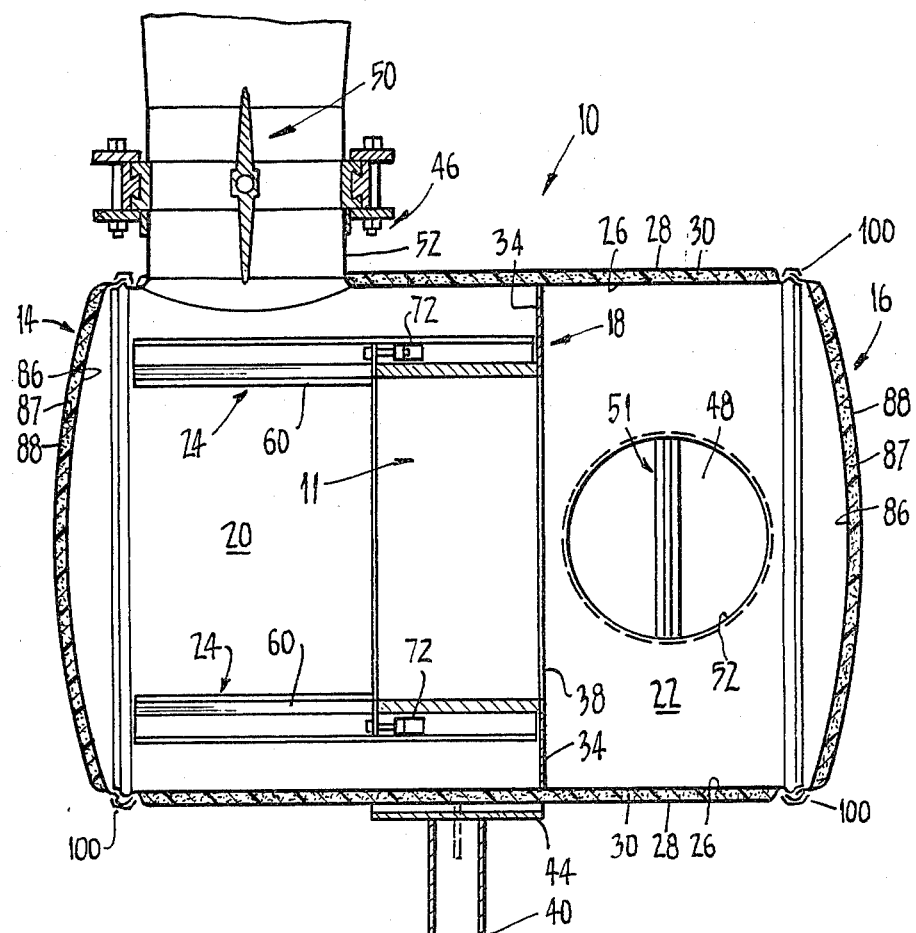
FIG. 3 is a less detailed view similar to that of FIG. 2 but showing the housing installed in a building with the HEPA filter and associated butterfly isolating valves connected in place.
Figure 8:
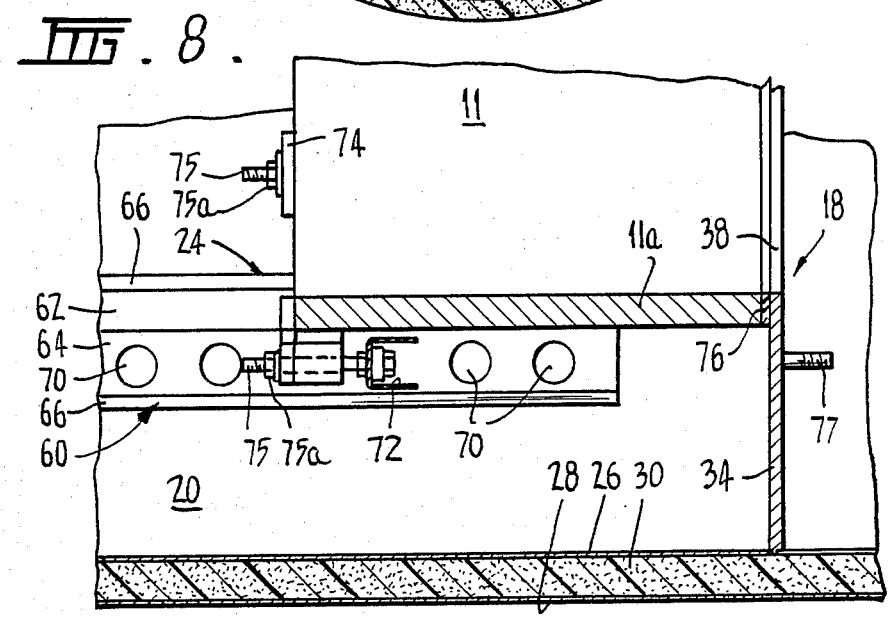

The illustrated housing 10 includes an open-ended double-walled tubular casing 12, respective cover members 14, 16 of shallow convex configuration for closing off the ends of casing 12, an internal baffle 18 (FIG. 2) dividing the interior of casing 12 into separate chambers 20, 22 and, wholly within chamber 20, slide structure 24 for slidably mounting a HEPA filter (11 in FIGS. 3, 8 and 9) within chamber 20 in abutment with baffle 18.

Figure 7:
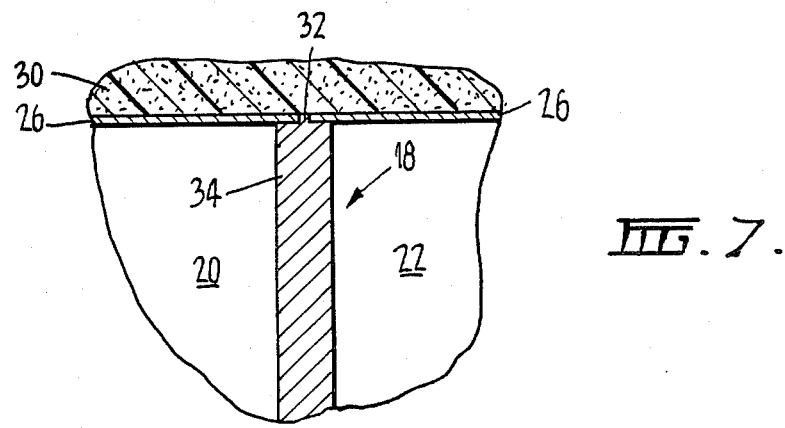
FIG. 7 is an enlargement of the region X of FIG. 2.

Casing 12 comprises an inner lining 26 of, say 1.6 mm, stainless steel and an outer cladding 28 of lighter gauge stainless steel, say 0.5 mm, encasing foamed polyethylene insulation 30. Lining 26 is actually in two parts which are separated but joined by welding by an annular extension 32 of baffle 18 (FIG. 7). This provision aids in ensuring a gastight connection at the outer periphery of the baffle.

Baffle 18 is formed of four identical shaped plates 34, as best seen in FIG. 6. These plates are joined at gastight welds 36 to define a square centre opening 38 which registers with the HEPA filter on mounting of the latter in slide structure 24. At least the portions of plates 34 which are engaged by the filter are surface treated for enhanced smoothness, such as by surface grinding.

Figure 5:
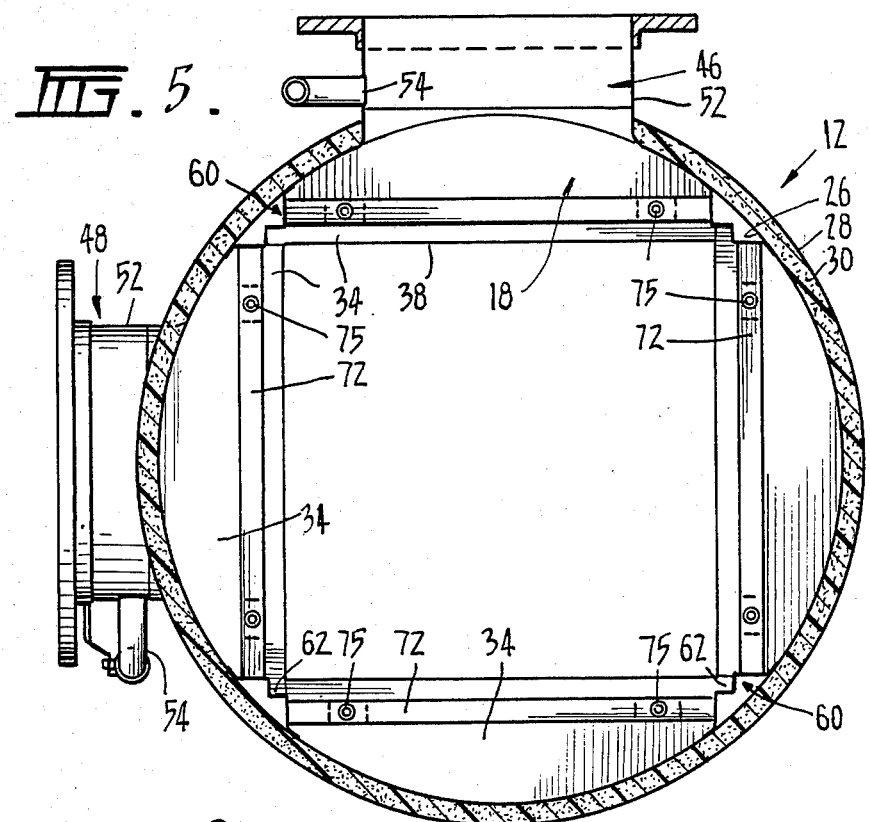
FIG. 5 is a cross-section on the line 5—5 in FIG. 1 with a filter in place.

In situ, casing 12 is mounted atop a pedestal 40 (FIG. 3) which is firmly secured on a concrete base 42 and carries a curved shoe 44 to seat casing 12. Gas flow through the interior of the casing is by way of intake/exhaust ports 46, 48 which respectively communicate with chambers 20, 22 and in use are fitted with gastight butterfly valves such as those visible at 50, 51 in FIG. 3. Each port 46, 48 is defined by a respective flanged sleeve 52 which is welded about its inner periphery to lining 26. Each sleeve 52 is penetrated (FIG. 5) by a seamless stainless steel gassing pipe 54, also associated with a gastight butterfly valve (not shown), to permit sterilization of the interior of the housing, and by a pressure tapping unit 56. All of the single ports may be substituted by manifold arrangements if such are found to enhance reliability and/or performance.

Referring in particular to FIGS. 2, 5, 8 and 9, slide structure 24 includes four uniform guide rails 60 which are secured to the inner surface of lining 26 symmetrically about axial planes at right angles to each other and at 45° to the axes of sleeves 52. Each guide rail 60 is somewhat of the shape of a lipped "W" in cross-section, defining a centre right angle track 62 open towards the axis of housing 12, outer webs 64, 65 also mutually at right angles, and edge lips 66 which abut and are welded to lining 26. The four right angle tracks 62 are positioned to define a firm guideway for a HEPA filter of rectangular configuration, which guideway extends from just inside the outer end of chamber 20 to a point displaced a short distance from baffle 18. The outer end of rails may be flared to facilitate engagement of a filter in the guideway.

The webs 64, 65 of each track 60 contain apertures 70 spaced along their length for selectively mounting a clamping frame to lock the filter in position. This frame comprises four steel channels 72, each carrying a pair of screw-threaded stubs 75 to which may be secured respective lugs 74 (FIGS. 8 and 9) projecting from the rear rim of the filter. The forward rim of the filter is typically provided with a neoprene gasket 76 which engages baffle 18 about opening 36 and is clamped gastight thereagainst by fastening nuts 75a onto studs 75.

Studs 75 are of sufficient length to additionally mount a pre-filter assembly when such is considered desirable. When the housing is used in the reverse mode, a pre-filter may be required in chamber 22 and to this end baffle 18 carries a set of screw-threaded studs 77.

Attention will now be directed, with particular reference to FIG. 10, to the arrangement by which each cover member 14, 16 is fastened in a gastight manner to a respective open end of casing 12. At each end of the casing, lining 26 overlaps cladding 28, the tube being bridged by an annular plastics trim 27 glued to the lining at 27a and grooved to 27b to receive the end of the cladding. Lining 26 is pressed to form an annular outside bead 80 and an inwardly turned shallow lip 82. Bead 80 is displaced rearwardly from lip 82 and defines a forward shoulder 81 substantially at right angles to the axis of the casing. Shoulder 81 received an elastomeric sealing ring 84 dimensioned to define an outside diameter slightly less than that of bead 80.

Figure 4:
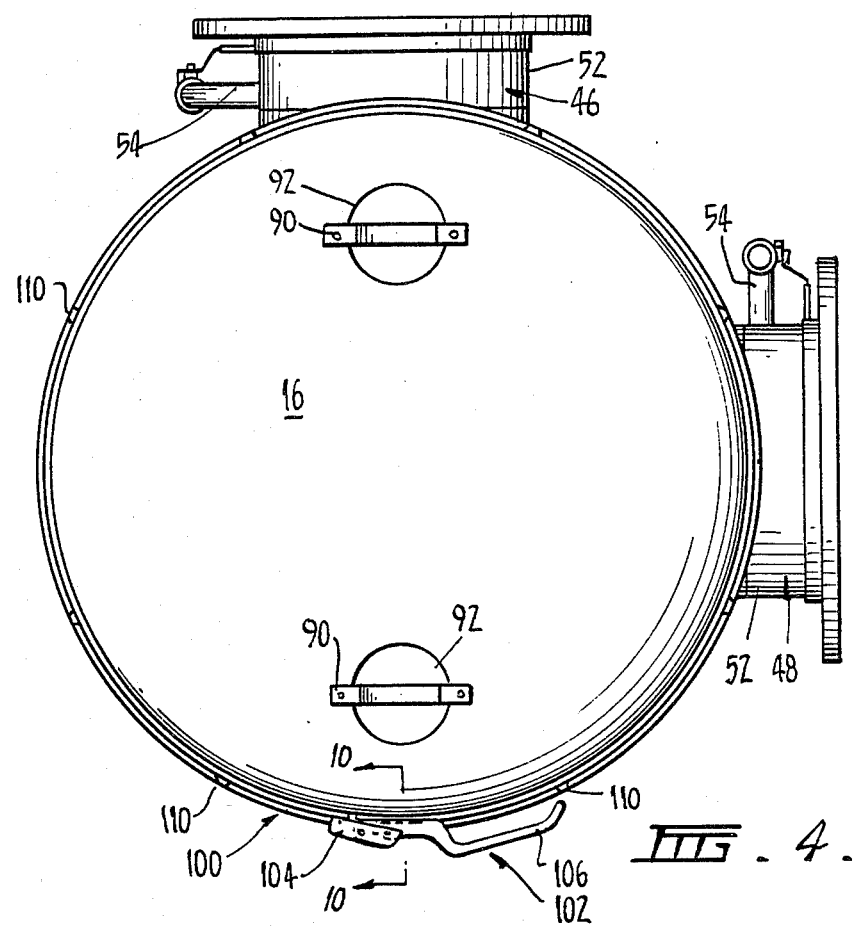
FIG. 4 is an end elevational view from the left in FIG. 1.

Each cover member 14, 16 is, like casing 12, double lined, incorporating a relatively thicker inner lining 86, a polyethylene insulation disc 87 and an outer relatively thinner gauge cladding 88. Each cover member is slightly convex and carries a pair of symmetrically disposed handles 90 fixed to cladding 88 above part-spherical recesses 92 (FIG. 4).

The outer peripheries of cover lining 86 are inturned and pressed together to define a flange 94 which is complementary to the end of casing lining 26. Flange 94 includes a first portion 96 which embraces the extremity of lining 26 and an outwardly upset end portion 98 dimensioned to fit snugly about and in contact with sealing ring 84. The two components of flange 94 are fused together at the extremity of the flange.

At each end, lining 26, including shoulder 81, cover flange portion 98 and sealing ring 84 are clamped together in a gastight manner by a band clamp 100 which is of V-section and double lipped at 101 to embrace bead 80 and cover flange portion 98. Each band clamp 100 is split and its ends are connected by an over-centre lock device 102, best seen in FIGS. 4 and 11. Lock device 102 comprises a bifurcated arm 104 pinned to one end of band clamp 100 and a lever 106 pinned at an extremity to the other end of the band clamp and at an intermediate point 105 to arm 104. Its action in altering the band clamp 100 from a band closed to a band open position, in which the band can be lifted away from the assembly to permit removal of the cover member, is best appreciated from an inspection of FIG. 11. In the closed position of the band, security seal means (not shown) is typically provided to prevent unauthorized removal of the cover member.

Cover lining 86 carries internal spring clips 108 which snap over casing lip 82 to locate the cover member as the band clamp is brought to its closed position. Lining 86 also mounts an annular array of external clips 110 to seat the band clamp when the cover is disengaged from the casing.

It is considered that the illustrated housing provides a highly satisfactory solution to the problem of mounting HEPA filters in air-conditioning or ventilation systems. The tubular form of the housing assists in ensuring the required degree of gastightness. The form of guide structure facilitates installation and removal of the fragile filter elements. The filter itself if easily mounted into one of the chambers and brought to an operational position in which there is a gastight seal between the two sides of the filter, apart from through the filter itself. The arrangement of the cover members permits easy and unobstructed access to the two chambers within the housing, and in particular to the full upstream and downstream faces of the filter for the purpose of leak testing in situ. The use of band clamps in association with the convex cover members ensures gastight closure and yet allows ready removal of the cover members.

I claim:

1. A housing for mounting a HEPA filter in an air flow circuit of a building air-conditioning or ventilation system, including an open ended tubular casing; baffle means formed to define an aperture and disposed to divide the interior of said casing into respective chambers which are accessible from respective open ends of the casing; gas ports for each of said chambers; and a pair of cover members for closing the respective open-ends of the casing, each of which cover members includes a flange complementary to the associated end of the casing; characterized by:

slide structure within one of said chambers for slidably moving a HEPA filter to a position in said one chamber in engagement with said baffle means;

first clamp means for clamping the forward end of the HEPA filter against said baffle means in a gastight engagement about said aperture by pressure applied to the rear end of the filgter; and second clamp means, independent of the first, and associated seal means, for clamping the cover members to said casing to effect gastight engagement of said flanges with the respective ends of the casing.

2. A housing according to claim 1 further characterized in that the casing is of circular or elliptical cross-section.

3. A housing according to claim 1 or 2 further characterized by an outer tubular part co-axially embracing said axially displaced parts, the annular space therebetween being packed with solid matter.

4. A housing according to claim 1 or 2 further characterized in that said cover members are of double walled construction.

5. A housing according to claim 1 or 2 further characterized in that said baffle means lies in a plane normal to the axis of the casing.

6. A housing according to claim 1 or 2 further characterized in that said casing and lower members are formed in sheet metal.

7. A housing according to claim 1 or 2 further characterized in that said first clamp means comprises multiple sets of threaded fixed studs and nuts engageable with lugs mounted to the rear end of the filter.

8. A housing according to claim 1 or 2 further characterized in that said casing and cover members are formed in sheet metal.

9. A housing according to claim 1 or 2 further characterized in that the cover members are of shallow convex configuration.

10. A housing according to claims 1 or 2 further characterized in that said cover members are provided with two or more spaced handles to facilitate their application to and removal from the housing.

11. A housing according to claim 1 or 2 further characterized in that the respective ends of the casing include an external annular bead and in that said flanges are flared to complement the respective beads.

12. A housing according to claim 1 or 2 further characterized in that each second clamp and seal means comprises a band arranged to be clamped about the respective flange and a sealing ring arranged to seat between the flange and the associated end of the casing.

13. A housing according to claim 12 further characterized in that said band is of general V-section, bordered by narrow lips.

14. A housing according to claim 1 or 2 further characterized in that said slide structure comprises a set of guide rails secured to the inside surface of said casing so as to extend parallel to the centre axis thereof.

15. A housing according to claim 14 further characterized in that the rails define four corner edge tracks for a rectangular HEPA filter.

16. A housing according to claim 15 further characterized in that the rails are of lipped "W" configuration.

* * * * *